Nov. 29, 1955　　　G. E. AMMERMAN　　　2,725,029
SLIDE RULE TYPE COOKING CHART

Filed Aug. 21, 1951　　　　　　　　　　　2 Sheets-Sheet 1

INVENTOR.
George E. Ammerman
BY
Harness, Dickey & Pierce
ATTORNEYS.

Nov. 29, 1955 — G. E. AMMERMAN — 2,725,029
SLIDE RULE TYPE COOKING CHART
Filed Aug. 21, 1951 — 2 Sheets-Sheet 2
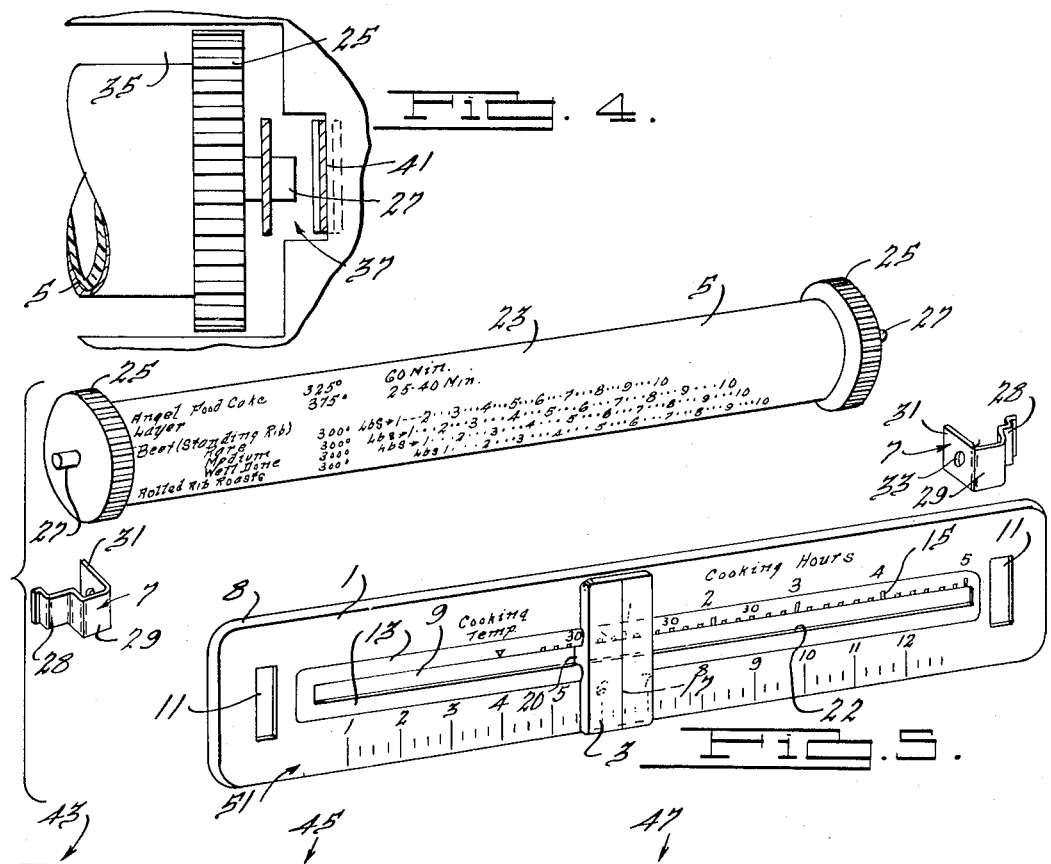
INVENTOR.
George E. Ammerman
BY
Harness, Dickey & Pierce
ATTORNEYS

United States Patent Office 2,725,029
Patented Nov. 29, 1955

2,725,029

SLIDE RULE TYPE COOKING CHART

George E. Ammerman, Clarks Summit, Pa., assignor to The Murray Corporation of America, Detroit, Mich., a corporation of Delaware Application August 21, 1951, Serial No. 242,954

6 Claims. (Cl. 116—133)

My invention relates to cooking charts and, more particularly, to a slide rule type of cooking chart which may be mounted on cooking ranges and by means of adjustment reveal the length of time and temperature at which various foods should be cooked.

It is an object of my invention to provide a slide rule type cooking chart in which the length of time and temperature at which various foods should be cooked may be speedily and efficiently determined without the necessity of looking up references or employing computation.

It is another object of my invention to provide a slide rule type cooking chart having relatively movable elements, on one of which a list of foods is provided and also the temperatures at which such foods should be cooked, and having associated scales on said elements cooperating so that direct readings in time may be obtained per unit of weight of a designated food.

It is a further object of my invention to provide a slide rule type cooking chart of the indicated description which is compact in construction and may be removably attached to a cooking range.

It is a further object of my invention to provide a slide rule type cooking chart of the character described which is simple in construction, positive in operation and inexpensive of manufacture.

These and other objects of my invention will become apparent from the following detailed description taken in conjunction with the accompanying drawings, wherein:

Fig. 4 is a sectional view of the structure illustrated in Fig. 3 taken along the line 4—4 thereof;

Fig. 5 is an enlarged exploded view in perspective of the cooking chart illustrated in Fig. 1; and Fig. 6 is a plan view of the chart inscribed on the roll illustrated in Fig. 5.

Figure 1:
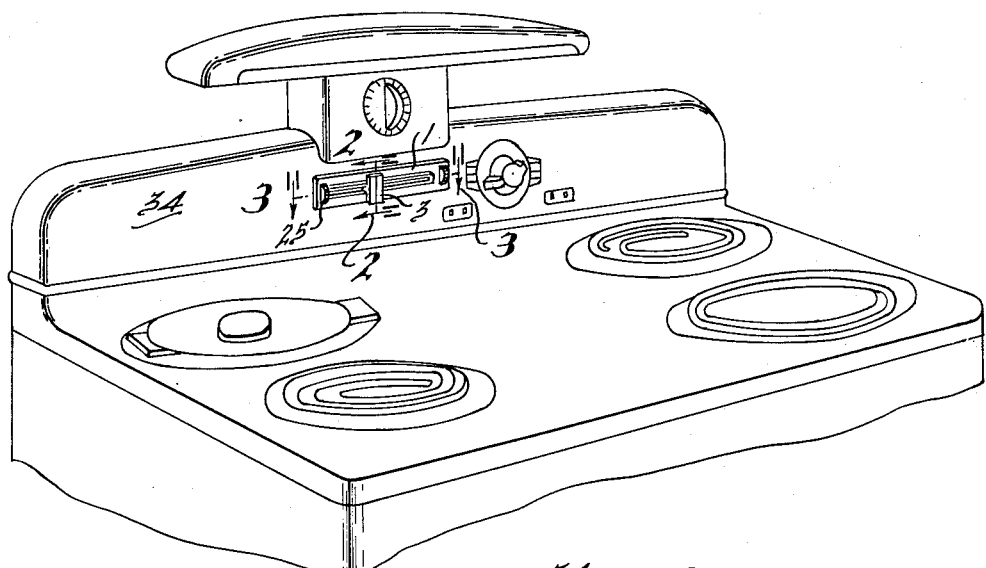
Figure 1 is a broken view in perspective illustrating a cooking range with my slide rule type cooking chart attached to the back guard thereof.
Figure 2:
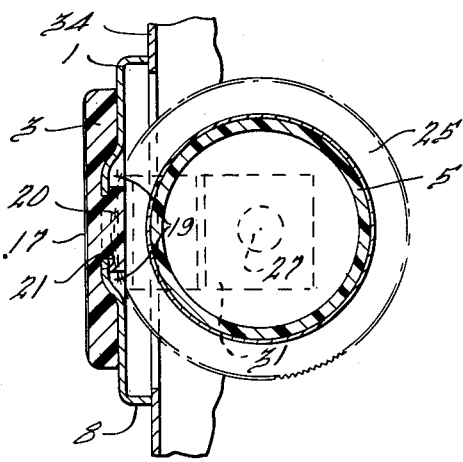
Fig. 2 is an enlarged sectional view of the structure illustrated in Fig. 1, taken along the line 2—2 thereof.
Figure 3:
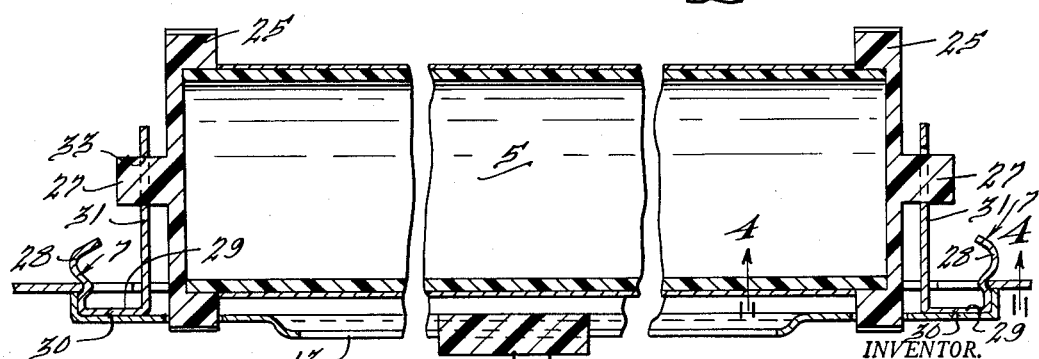
Fig. 3 is an enlarged sectional view of the structure illustrated in Fig. 1, taken along the line 3—3 thereof.

The embodiment of my invention here described is composed of five separate parts: a frontal plate 1, a slide 3 associated therewith, a drum-type roll 5, and two clips 7 removably holding the axis of the roll 5 in fixed relationship with the frontal plate 1.

The frontal plate 1 is an elongated strip of stamped sheet metal having inwardly flanged edges 8 and a longitudinally extending slot 9 therein for the sliding retention of the slide 3. Two transversely extending slots 11 in the frontal plate 1 are disposed on either side of the longitudinal slot 9. An area around the longitudinally extending slot 9 is outwardly embossed forming shoulders 13 containing indicia 15.

The slide 3 is made of transparent plastic, is rectangularly shaped and provided with a vertically extending line 17 through its center, said line 17 serving as an indicator. The inner surface of the slide 3 has parallel recesses 19 horizontally extending thereacross which are separated by an inwardly projecting centrally disposed boss 20 at the base of which guideways 21 are provided. In order that the slide 3 may be slidably held in the longitudinally extending slot 9, the embossed shoulders 13 are outwardly deflected to spread the edges 22 of the slot 9 sufficiently to receive the boss 20 and position the guideways 21 adjacent to said edges 22. The shoulders 13 are then allowed to snap back into their normal position with the edges 22 of the slot 9 disposed in said guideways and the shoulders 13 in said recesses 19. The edges 22 are thus held in the guideways 21 with a minimum of friction therebetween, allowing the slide 3 to be easily moved along the length of the longitudinal slot 9.

The roll 5 is a solid plastic molding but may be made from any convenient rigid and inscribable material. The roll 5 has five portions: a cylinder 23 having indicia thereon, two identical cylindrical knobs 25 which are disposed on either end of the cylinder 23, secured thereto, coaxially aligned therewith, and have serrated peripheries, and two identical pins 27 projecting centrally outwardly from the knobs 25.

Each of the clips 7 is made from a strip of resilient metal which may be bent to the required shape. The clips take the shap of an L with an S-shaped portion 28 attached to the lower part thereof and extending parallel to the vertical length of the L. The portion 29 of the L is welded to the inner surface of the frontal plate at 30 between the transversely extending slot 11 and the end of the frontal plate 1. The portion 31 of the L extends normally from the frontal plate 1 and parallel to the sides of the knobs 25 and has a cylindrical aperture 33 extending therethrough near its end in which the pins 27 are journaled for rotation. The portion 29 extends outwardly from the portion 31 and perpendicularly thereto.

With the clips 7 welded to the frontal plate 1, the pins 27 of the roll 5 may be inserted in the apertures 33 so as to hold the axis of the roll 5 in fixed relationship with the frontal plate 1. This is accomplished by bending the portions 31 of the clips 7 in an outward direction. This allows room for the pins 27 to be inserted in the apertures 33. The tension on the portions 31 is released so that the clips 7 may assume their normal shape and rotatably hold the roll 5.

In order that the assembled structure may be mounted on a cooking range, an area is cut out from some flat surface of the range, such as the back guard 34. The cutout portion 35 is of the same shape as the frontal plate 1 but is slightly smaller in size so as to be completely covered thereby. At each end of the cutout portion 35, a recess 37 is provided of such width as to receive the S-shaped portion 28 of the clips 7 which are securely anchored to the edge 41 thereof. When this insertion is made, the S-shaped portions 28 snap over the edges 41 and securely lock the cooking chart to the range with the flanged edges 8 of the frontal plate 1 engaging the flat surface of the back guard 34.

Both the roll 5 and the frontal plate 1 are painted or otherwise coated so that they are pleasing in appearance and the indicia on the cylinder 23 is legible through the longitudinal slot 9. The knobs 25 of the roll 5 protrude through the transverse slots 11 so that the user may easily turn the entire roll 5. As the roll 5 turns, the various rows of indicia which are inscribed on the cylinder 23 consecutively appear in view through the slot 9.

The indicia which is on the cylinder 23 is shown in Fig. 6. The name of the food 43, the temperature at which the food should be cooked 45, and a variety of possible weights for that food 47 are arranged in horizontal rows. The names of the foods 43 are on the lefthand side of the chart. Adjacent the names of the foods 43 are the temperatures at which they should be cooked. On the right-hand side is the scale of weights which increase in amount from left to right.

The indicia which is on the frontal plate 1 above the longitudinal slot 9 is shown in Fig. 5. Above the point where the temperatures 45 appear are the words "cooking temp" and an arrow pointing downward. Above the weights 47 is a scale of hours representing the number of hours a food is to be cooked, and also small lines marking smaller fractions of time therebetween. Above this are the words "cooking hours."

In the operation of this device, the user first adjusts the roll 5 until the food which is desired to be cooked appears in view through the slot 9. Then the slide 3 is set so that its vertical line 17 aligns with the weight of the food to be cooked. Then the user merely reads up the line 17 to the frontal plate 1 and notes the number of cooking hours indicated by the line 17. The line 17 will be over the number or marking indicating the length of time that food should be cooked, and direct reading for the full cooking time is thereby obtained without requiring computation. The temperature may easily be read adjacent the name of the food.

It may be noted that the heavier the food the longer time it takes to cook that food. For this reason, both the cooking hours and the possible weights increase from the left to the right.

In some cases, such as roasts and steaks, the user may wish the food to be either rare, medium, or well-done. Allowances for such variations in taste are made by providing separate rows for each type of cooking under the names of foods where such variations occur. It may also be seen that in some cases the weight of a food does not vary; such is the case with those foods generally indicated at 49 in Fig. 6. In these cases, the length of time of cooking is put on the roll 5 adjacent the temperature for that food and this is read directly therefrom, without the use of the slide.

The frontal plate 1 is provided with a second time scale 51 which has a twelve-hour range and is positioned below the longitudinal slot 9. When the housewife has determined the length of time the food should be cooked by the process already described, this time may be added to the time at which the food is put in the oven, so as to determine when the food will be done. The slide 3 may then be set at this time or the time scale 51. Thus, this scale serves to remember the time at which the cooking will be completed, and save the housewife the trouble of trying to remember this time or the trouble caused by forgetting this time.

It may be seen that my invention provides an attractive, inexpensive and handy device whereby the length of time and temperature at which various foods should be cooked may be speedily and efficiently determined and the end of the cooking time may be mechanically remembered.

While only one specific embodiment of my invention has been illustrated and described herein, it will be readily appreciated by those skilled in the art that numerous modifications and changes may be made without departing from the spirit of the invention.

What is claimed is:

1. A cooking chart device including a frontal member for enclosing an aperture in a panel, a slide member slidably retained on said frontal member, a cylindrical roll rotatably supported on the rear of said frontal member within an area less than the area of the aperture so as to pass therethrough and having the names of foods and their cooking temperatures inscribed circumferentially therearound, a scale in weight and a scale in time, one of said scales being positioned on said roll so as to provide a set of units for each food and the other of said scales being positioned on said frontal member, said slide member having an indicator thereon whereby to relate said scales so as to provide direct readings in time for any weight of a selected food.

2. The construction set forth in claim 1 in which a second time scale is positioned on said frontal member at any point of which said indicator may be set so as to indicate the time the cooking of any food will be completed.

3. A cooking chart device comprising a frontal plate having a longitudinal slot therethrough and transverse slot adjacent one end thereof, a cylindrical roll having a knob secured to one end thereof for mutual rotation therewith, said knob projecting through said transverse slot, means on the inner surface of said frontal plate for rotatably supporting said cylindrical roll thereto so that the circumference of said roll is adjacent said longitudinal slot, and clip means secured to the inner surface of the frontal plate and adapted to secure said frontal plate to opposite edges of an aperture in a supporting member covered by said frontal plate.

4. A cooking chart device comprising a frontal plate having a longitudinal slot therethrough and a transverse slot adjacent one end thereof, a cylindrical roll having a knob secured to one end thereof for mutual rotation therewith, a clip having an L portion and an S portion, one part of said L portion being secured to the inner surface of said frontal plate, the other part of said L portion projecting normally from said frontal plate and rotatably supporting said cylindrical roll in the rear of said frontal plate with said knob projecting through said transverse slot, said S-shaped portion extending normally from said part of the L portion secured to the inner surface of said frontal plate and being adapted for snap engagement with a cooperating supporting surface.

5. A chart device including, in combination, a frontal plate of a size to cover an aperture in a supporting panel, said plate having a longitudinal and a transverse slot therein, a roll rotatably supported on the rear of said plate behind said longitudinal slot having a knob thereon disposed through said transverse slot, and spring clips supported on the rear of said plate for releasably engaging the edge of an aperture in a supporting panel for securing the plate thereon in a manner to cover the aperture therein.

6. A chart device including, in combination, a frontal plate of a size to cover an aperture in a supporting panel, said plate having a longitudinal and a transverse slot therein, a roll rotatably supported on the rear of said plate behind said longitudinal slot having a knob thereon disposed through said transverse slot, spring clips supported on the rear of said plate for releasably engaging the edge of an aperture in a supporting panel for securing the plate thereon in a manner to cover the aperture therein, the edge portions of the plate along said longitudinal slot being embossed outwardly, and a transparent slide member having spaced oppositely presenting notches receiving the edge portions of the plate in a manner to permit the member to slide therealong.

References Cited in the file of this patent

UNITED STATES PATENTS

| | | |
|---|---|---|
| 760,360 | Wiley | May 17, 1904 |
| 1,269,217 | Henning | June 11, 1918 |
| 1,778,593 | Hain | Oct. 14, 1930 |
| 1,959,636 | Obidine | May 22, 1934 |
| 2,176,003 | Palmer | Oct. 10, 1939 |
| 2,179,565 | Stark | Nov. 14, 1939 |
| 2,282,843 | Adler | May 12, 1942 |
| 2,477,392 | Rude | July 26, 1949 |
| 2,503,255 | George | Apr. 11, 1950 |
| 2,520,725 | Judd | Aug. 29, 1950 |